United States Patent
Yeh et al.

(10) Patent No.: US 7,200,523 B1
(45) Date of Patent: Apr. 3, 2007

(54) METHOD AND SYSTEM FOR FILTERING STATISTICAL PROCESS DATA TO ENHANCE PROCESS PERFORMANCE

(75) Inventors: Shuh-Chwen Yeh, Taipei (TW); Chun-Hsien Lin, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 11/290,108

(22) Filed: Nov. 30, 2005

(51) Int. Cl.
*G06F 11/30* (2006.01)

(52) U.S. Cl. .................... 702/182; 702/117; 700/108

(58) Field of Classification Search ............... None
See application file for complete search history.

(56) References Cited

U.S. PATENT DOCUMENTS

| | | | | |
|---|---|---|---|---|
| 6,153,115 | A * | 11/2000 | Le et al. | 216/60 |
| 6,389,366 | B1 * | 5/2002 | Heavlin | 702/84 |
| 6,442,445 | B1 * | 8/2002 | Bunkofske et al. | 700/108 |
| 6,584,368 | B2 * | 6/2003 | Bunkofske et al. | 700/83 |
| 6,678,569 | B2 * | 1/2004 | Bunkofske et al. | 700/108 |
| 6,727,106 | B1 * | 4/2004 | Ankutse et al. | 438/5 |
| 6,772,034 | B1 * | 8/2004 | Shi et al. | 700/121 |
| 6,970,758 | B1 * | 11/2005 | Shi et al. | 700/108 |
| 6,999,836 | B2 * | 2/2006 | Schwarm et al. | 700/121 |
| 2002/0026251 | A1 * | 2/2002 | Johnson et al. | 700/67 |
| 2002/0062162 | A1 * | 5/2002 | Bunkofske et al. | 700/108 |
| 2003/0055523 | A1 * | 3/2003 | Bunkofske et al. | 700/108 |
| 2003/0226821 | A1 * | 12/2003 | Huang et al. | 216/59 |
| 2004/0006447 | A1 * | 1/2004 | Gorin | 702/181 |
| 2004/0185583 | A1 * | 9/2004 | Tomoyasu et al. | 438/8 |
| 2004/0267399 | A1 * | 12/2004 | Funk | 700/121 |
| 2005/0084988 | A1 * | 4/2005 | Huang et al. | 438/9 |
| 2005/0119852 | A1 * | 6/2005 | Iguchi et al. | 702/118 |
| 2005/0132306 | A1 * | 6/2005 | Smith et al. | 716/1 |
| 2005/0171627 | A1 * | 8/2005 | Funk et al. | 700/121 |
| 2005/0187649 | A1 * | 8/2005 | Funk et al. | 700/121 |
| 2005/0221514 | A1 * | 10/2005 | Pasadyn et al. | 438/14 |
| 2006/0015206 | A1 * | 1/2006 | Funk et al. | 700/121 |
| 2006/0047356 | A1 * | 3/2006 | Funk et al. | 700/121 |
| 2006/0064193 | A1 * | 3/2006 | Yamashita et al. | 700/121 |
| 2006/0150129 | A1 * | 7/2006 | Chiu et al. | 716/4 |

OTHER PUBLICATIONS

Lee et al., "RTSPC: A Software Utility for Real-Time SPC and Tool Data Analysis", IEEE, 1995.*
Aston, "Improving SPC in a Wafer Fabrication Environment", IEEE, 1998.*

* cited by examiner

*Primary Examiner*—Marc S. Hoff
*Assistant Examiner*—Mary Catherine Baran
(74) *Attorney, Agent, or Firm*—Haynes and Boone, LLP

(57) ABSTRACT

A data filter for filtering process data to a statistical control model is provided to enhance the performance of the control model. The data filter selects a set of template data from a set of statistical process data. A set of grids is formed comprising the set of template data and a set of sample data and an absolute distance is calculated between each point of a grid in the set of grids and a minimum accumulated distance of a point of the grid is calculated using the absolute distance. A global optimal path is identified based on the minimum accumulated distance of the point, and a set of sample data is remapped to form a set of warped data based on the global optimal path and the set of reference data.

22 Claims, 16 Drawing Sheets

Figure 5

3. Calculate absolute distance *d* of each grid $$\underline{50}\, d(i,j) = [T(i,:) - R(j,:)]^2 \quad : = 1 \text{ to N in general}$$

d(t,r) = [T(t,1) – R(r,1) + T(t,2) – R(r,2) + … + T(t,N) – R(r,N)]²

If N = 1, then d(t,r) = [T(t,1) – R(r,1)]² = (221-220)² = 1 d(3,1) = [T(3,1) – R(1,1)]² = (11-5)² = 36

4. Calculate minimum accumulated distance of each point

70

$$D(i,j) = d(i,j) + \min[D(i-1,j), D(i-1,j-1), D(i,j-1)]$$

FIGURE 15
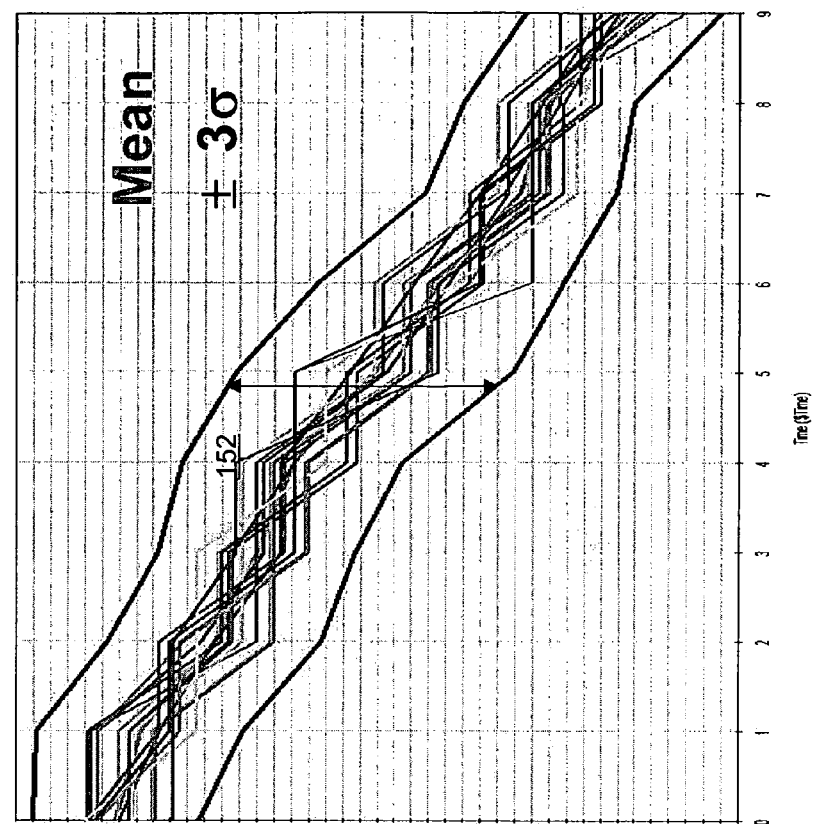
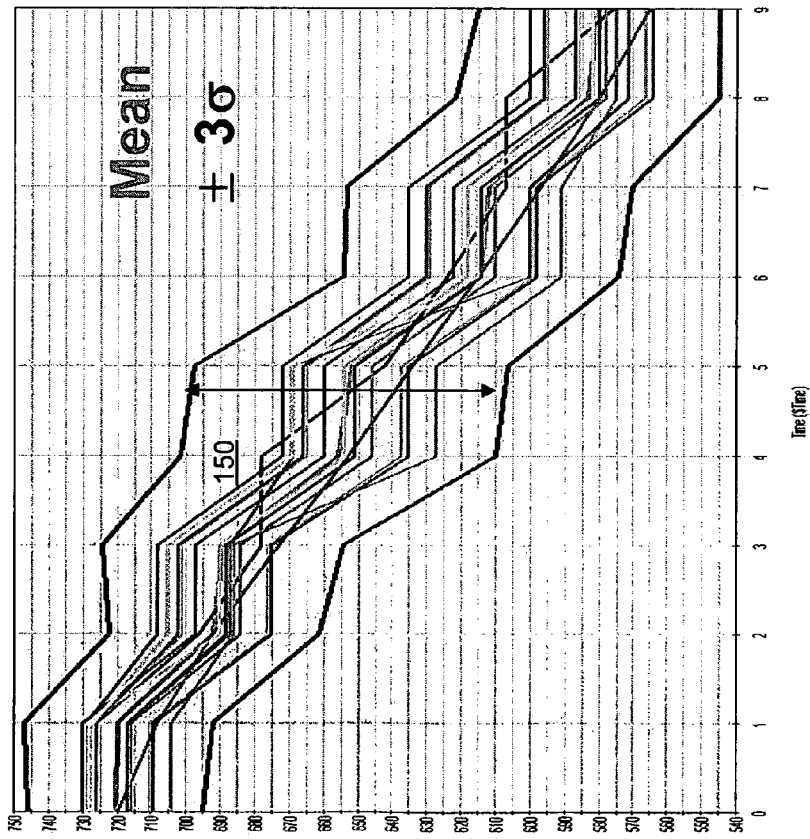

METHOD AND SYSTEM FOR FILTERING STATISTICAL PROCESS DATA TO ENHANCE PROCESS PERFORMANCE

BACKGROUND

In semiconductor manufacturing, groups or "batches" of wafers are manufactured through a series of processes. Typically, a number of measurements are observed at one or more of the processes to assess performance. Examples of such measurements include wafer temperature, wafer thickness, and the like. These measurements can then be provided to a control model to provide a statistical characterization for the state of each process. This characterization of data, however, is lacking for several reasons. One reason is that that time intervals between the processes are not uniform. Another reason is that the total duration of the process for each batch of wafers can be different. Yet another reason is that collected time registrations are not synchronized to one another and common events are not aligned. Another reason is that some measurements are not included in the data collection. As a result, limits of the control model have to be broadly defined, which leads to potential faults that would otherwise be detected.

Typically, control models use statistical analysis to accommodate these potential faults. One statistical analysis device utilizes a calculated average of readings across time samples for processing steps of each batch. This device, however, fails to show dynamic variations with respect to time, because only an average value of each processing step of wafer batches is calculated. For example, the average values across several wafers or several batches may remain very close even though the variable profiles behave very differently with respect to time. In addition, due to unsynchronized projected trajectories of the control models, the anticipated data pattern may not be reached and misleading conclusions may be drawn as a result.

Furthermore, if measurements are missing from the control model, the missing measurements are assumed to be insignificant for the collected data. For example, if a measurement is missing from a data collection, an average based on the remaining measurements is calculated instead of an average based on the entire measurement. This may result in an output that does not provide a correct statistical characterization of the data.

Moreover, current control models are insensitive to spikes or other abrupt changes, such as a dramatic drop of values, that need extra attentions. This may also result in an output that does not provide a correct statistical characterization of the data.

Therefore, a need exists for a control model and method that screens or filters the collected data in such a way that synchronizes wafer-to-wafer and/or batch-to-batch maturity, equalizes wafer process durations, handles missing data, and adjusts incidental anomalies.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. It is also emphasized that the drawings appended illustrate only typical embodiments of this invention and are therefore not to be considered limiting in scope, for the invention may apply equally well to other embodiments.

FIG. 5 is a diagram of an exemplary calculation of an absolute distance d;

FIG. 15 a diagram of exemplary tightening of data range by the data filter of the disclosure.

DETAILED DESCRIPTION

The present disclosure relates generally to a method and a system for filtering statistical process data to enhance process performance. It is understood, however, that specific embodiments are provided as examples to teach the broader inventive concept, and one of ordinary skill in the art can easily apply the teachings of the present disclosure to other methods and systems. Also, it is understood that the methods and systems discussed in the present disclosure include some conventional structures and/or steps. Since these structures and steps are well known in the art, they will only be discussed in a general level of detail. Furthermore, reference numbers are repeated throughout the drawings for the sake of convenience and clarity, and such repetition does not indicate any required combination of features or steps throughout the drawings.

Figure 1:
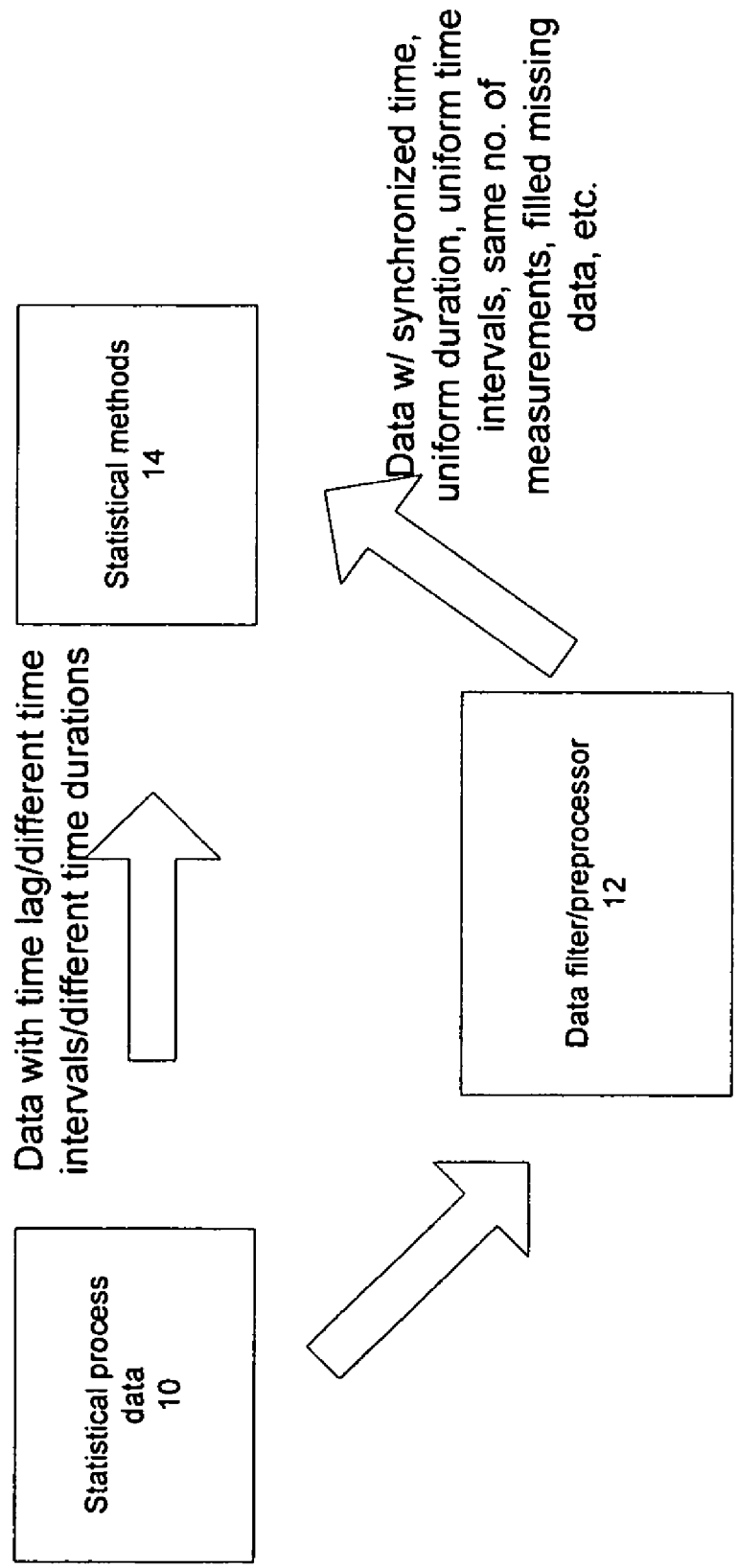
FIG. 1 is a flow diagram of an embodiment of a system for filtering statistical process data to enhance process performance.

FIG. 1 is a flow diagram of an embodiment of a system for filtering statistical process data to enhance process performance. Statistical process data 10 is collected from different tools during processing steps of wafer batches. This statistical process data 10 comprises time lags between different batches of wafers in the same processing step. One batch of wafers is different from another batch even if their recipes are the same. In addition, for the same batch of wafers, time durations are also different in statistical process data 10. Thus, the processing time durations of the same batch are not uniform. Furthermore, the time intervals for each process step are different in the statistical process data 10. Other characteristics of statistical process data 10 not shown in FIG. 1 include missing measurements and non-synchronized time registrations, which means that wafer profile patterns reach their peaks at different times. In one embodiment, statistical process data 10 is directly used as inputs into statistical methods 14, which uses the data to determine the state of each process. In another embodiment, statistical process data 10 is provided to a data filter or preprocessor 12 (hereinafter "data filter"), before being provided to the statistical methods 14, as discussed in greater detail below.

In an illustrative embodiment, the data filter 12 provides the "right" data to statistical method 14, such that all properties of interest may be preserved without suffering from poor statistics. The "right" data refers to a more complete and synchronized set of data. The data filter 12 employs a technique that maps a set of collected data against a set of reference data by translating, expanding, and contracting localized segments within each set of data to determine a minimum distance. The set of reference data represents reasonable normal operating conditions and provides the best results in terms of final monitoring. Thus, the data filter 12 captures more important characteristics of wafer batches. With data filter 12, collected statistical process data 10 with inconsistent sizes may be transformed into data sets of consistent sizes. This means that the collected statistical process data 10 will have a same number of measurements. In addition, common events, such as peaks and drops, may be synchronized and not biased. Furthermore, trigger incapability, a software-induced problem, may be properly assessed. Time intervals between each processing step may be equalized. Missing data may be filled making the profile complete and incidental outliers may be adjusted without losing substantial features. Outliers refers to data that is collected unexpectedly. Moreover, the range of data variation may be tightened within the raw data. Thus, wafer profile variations may become smaller.

Figure 2:
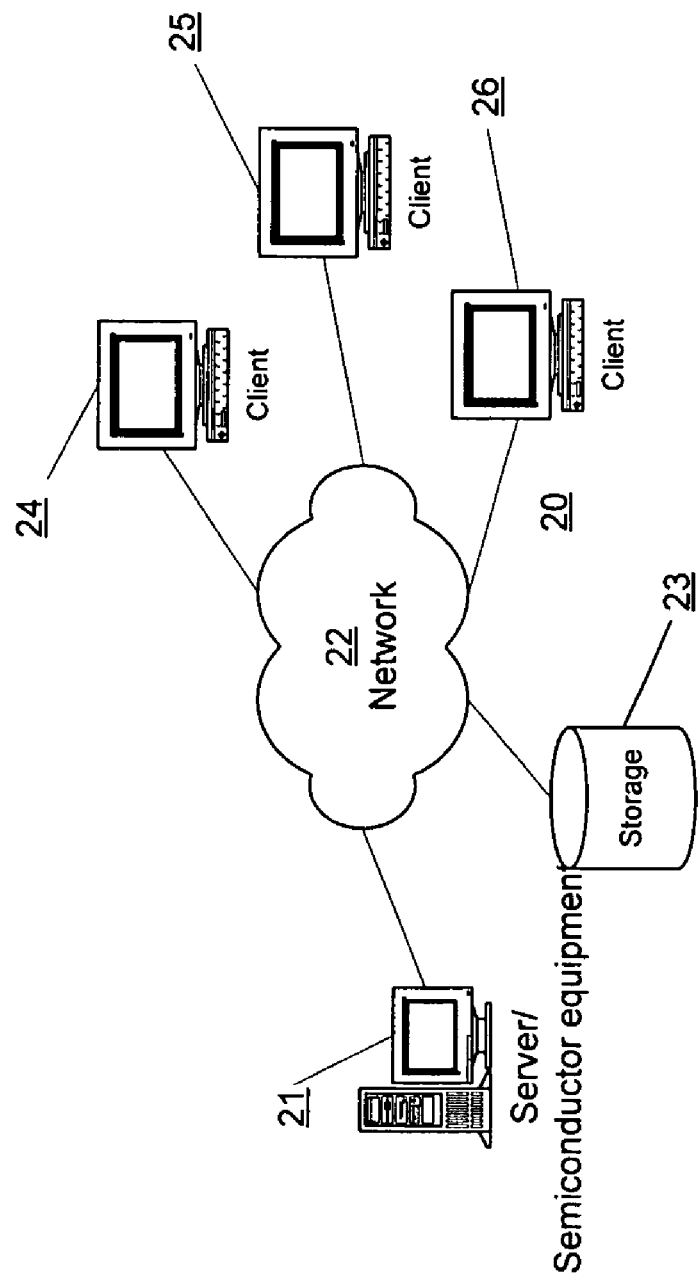
FIG. 2 is a diagram of a network of data processing systems in which a system for filtering statistical process data to enhance process performance may be implemented.

FIG. 2 is a diagram of a network of data processing systems in which a system for filtering statistical process data to enhance process performance may be implemented. A data processing system 20 includes a network 22, which is the medium used to provide communications links between various devices and computers connected together within the data processing system 20. Network 22 may include connections such as wire, wireless, or fiber optic cables. Network 22 may include the Internet and/or a collection of networks and gateways that use such things as a Transmission Control Protocol/Internet Protocol (TCP/IP) suite of protocols to communicate with one another. In another example, network 22 may include a number of different types of networks, such as a local area network (LAN), or a wide area network (WAN).

Figure 3:
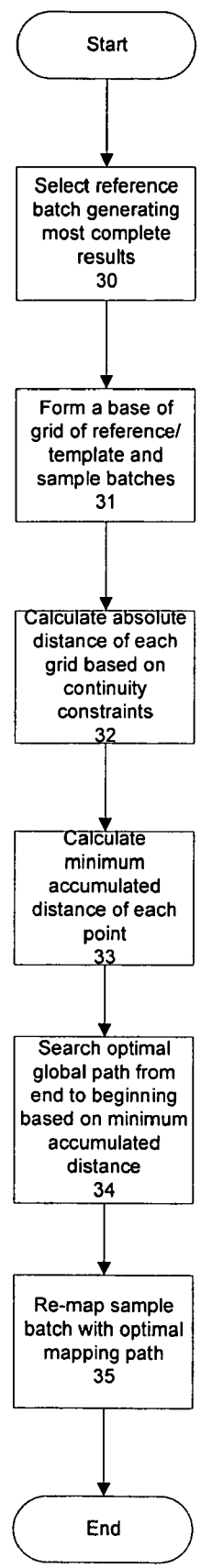
FIG. 3 is a process flowchart of an embodiment of a method for filtering statistical process data to enhance process performance.

In the depicted example, a server 21 is coupled to network 22 along with a storage unit 23. In addition, clients 24, 25, and 26 are also coupled to the network 22. Clients 24, 25, and 26 may be personal computers or other types of client devices, such as personal digital assistant (PDA), tablet personal computer (PC), and the like. In the depicted example, server 21 provides data, such as boot files, operating system images, and applications to clients 24–26. In addition, server 21 may be implemented as a semiconductor equipment. Network data processing system 20 may include additional servers, clients, and other devices not shown herein. The method and system for filtering statistical process data to enhance process performance may be implemented within client 24, 25, and/or 26, or server 21. FIG. 2 is intended as an example, and not as an architectural limitation for the present disclosure FIG. 3 is a process flowchart of an embodiment of a method for filtering statistical process data to enhance process performance. As shown in FIG. 3, the process begins at step 30, where a reference batch generating the most complete results in terms of final monitoring is selected. A reference batch generating the most complete results refers to a batch that has measurement data collected most frequently within a certain period of time. For example, out of 100 measurements collected in a given time period, a batch that has 99 measurements collected during this time period is selected as a reference batch, because this batch produces a more complete set of data and with the higher number of measurements compared to the remaining batches.

Once the reference batch is selected, the process proceeds to step 31, where the base of a grid of reference/template and sample batches is formed. More details regarding the base of a grid of reference and sample batches are discussed below with reference to FIGS. 4A–4B. At this step, the local continuity constraints are setup. The process then proceeds to step 32, where the absolute distance of each grid is calculated based on the local continuity constraints. More details regarding the calculation of the absolute distance of each grid and local continuity constraints are discussed below with reference to FIGS. 5 and 6, respectively.

Then, the process proceeds to step 33, where a minimum accumulated distance of each point is calculated. More details regarding the calculation of the minimum accumulated distance of each point are discussed below with reference to FIG. 7. Based on the minimum accumulated distance of each point, the process proceeds to step 34 to search for a global optimal path starting from an end to a beginning of the grid. More details regarding the search of a global optimal path are discussed below with reference to FIG. 8. Finally, the process proceeds to step 35, where the sample batch is re-mapped with the global optimal path determined in step 34. More details regarding the remapping of the sample batch with the global optimal path are discussed below with reference to FIG. 9. Thus, the process terminates thereafter.

Figure 4A:
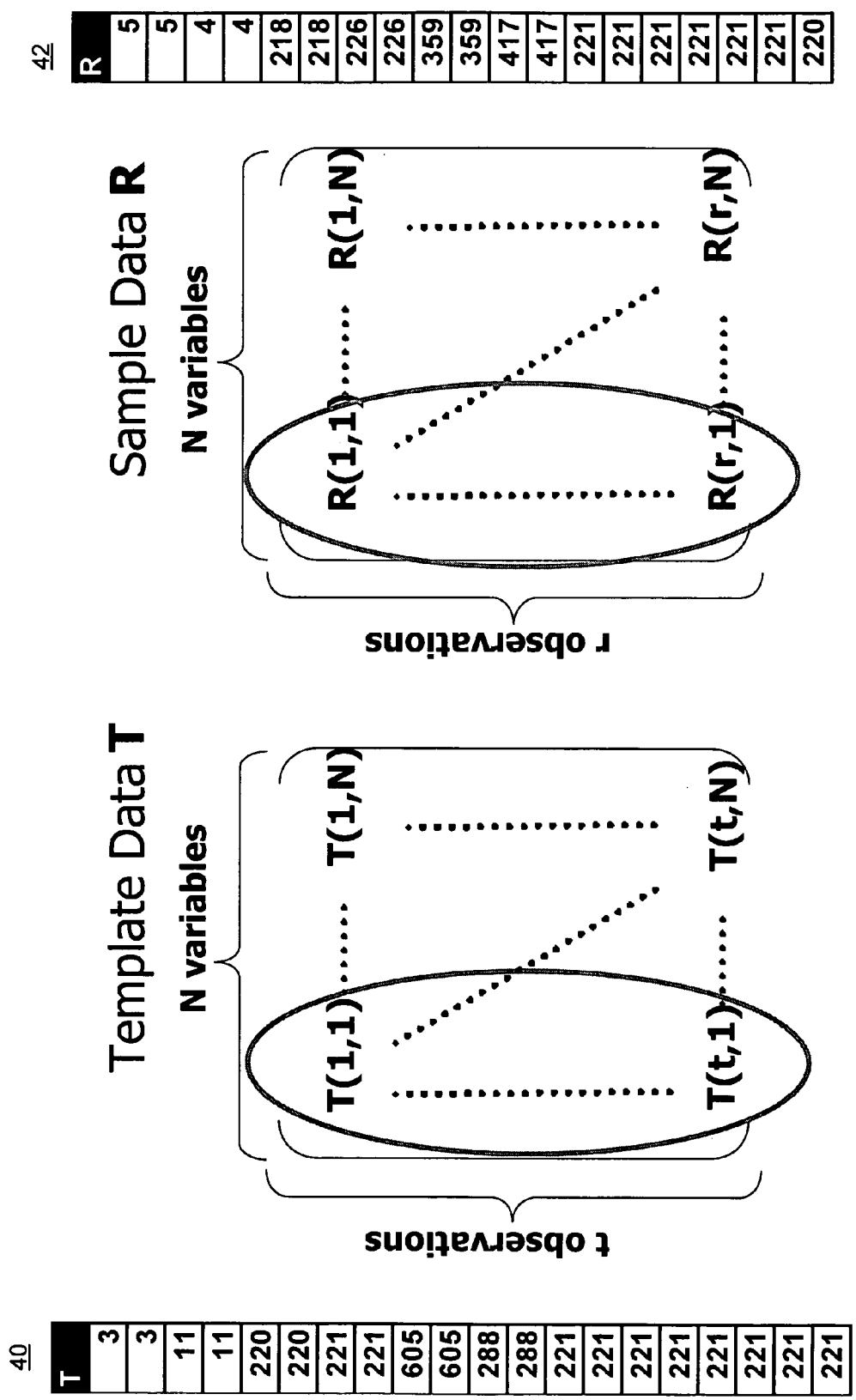
FIG. 4A is a diagram of exemplary reference and sample data.

FIG. 4A is a diagram of exemplary reference and sample data. As shown in FIG. 4A, template data T is the a reference batch that gives the most complete results in terms of final monitoring. Template data T comprises t number of observations with N number of variables. Observations refers a point in time in which a measurement is taken. Examples of variables for t observations include a temperature of the wafer, a pressure of the wafer, a thickness of the wafer, and the like. Sample data R is a sample batch. Sample data R comprises r number of observations with N number of variables. An example of template data T is one out of fifty wafer batches that has the most complete measurements, where the fifty wafer batches all share the same recipe. The remaining forty-nine batches becomes sample data R. In this example, exemplary template data T for the first variable from 1 to t observations is shown in column 40 and exemplary sample data R for the first variable from 1 to r observations is shown in column 42.

Figure 4B:
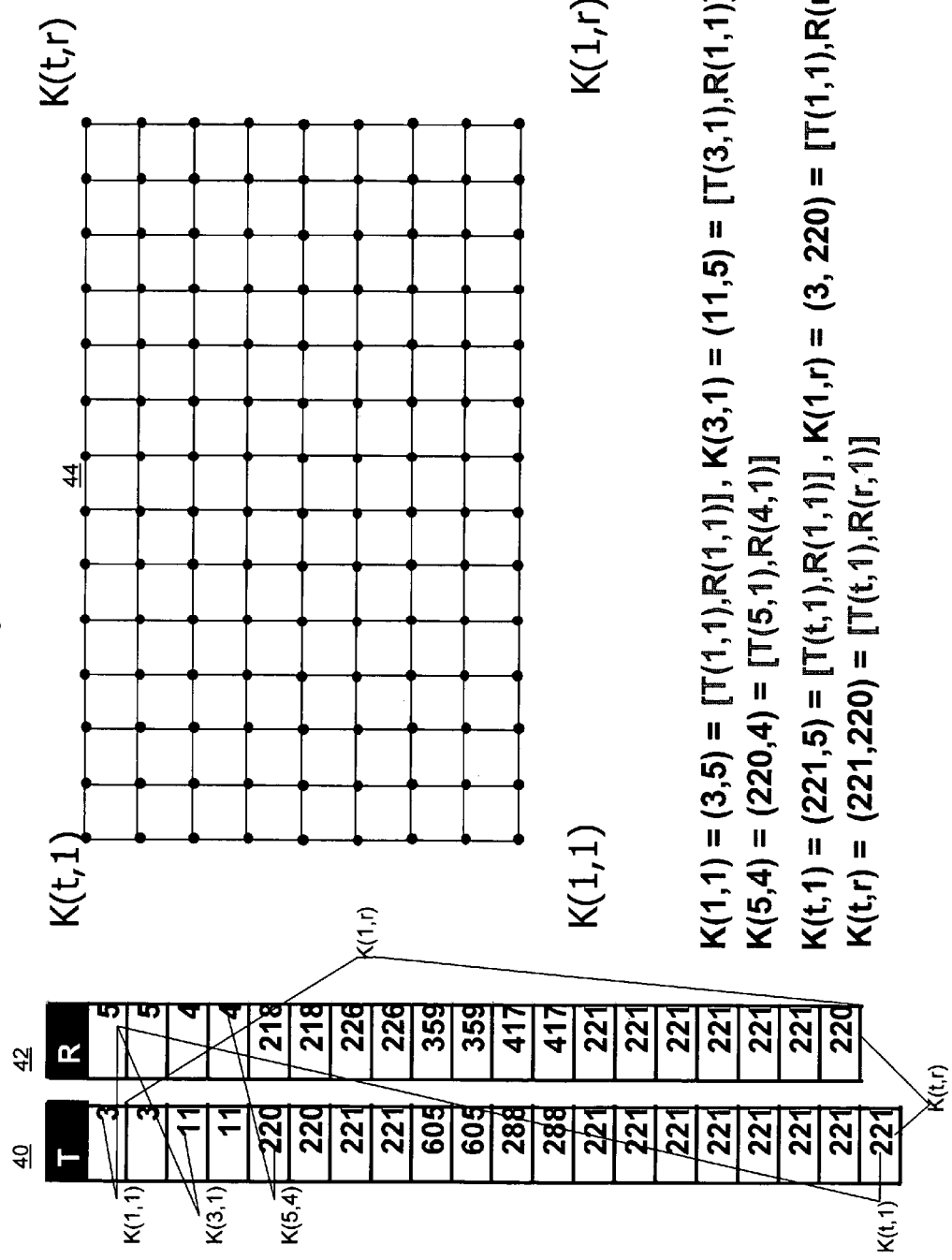
FIG. 4B is an exemplary set of grids comprising reference and sample batches.

FIG. 4B is an exemplary set of grids comprising reference and sample batches. As shown in FIG. 4B, a set of grids 44 is formed based on template data T 40 and sample data R 42 in FIG. 4A. Each grid in the set of grids 44 includes a set of points. Each point represents a set of values measured for a particular template data and sample data combination. For example, K(1,1) represents a value measured for a template data and sample data combination of [T(1,1), R(3,1)], which is (3,5). K(3,1) represents a set of values measured for a template data and sample data combination of [T(3,1), R(1,1)], which is (11,5). K(5,4) represents a set of values measured for a template data and sample data combination of [T(5,1), R(4,1)], which is (220, 4). Similarly, K(t,1) represents a set of values measured for a template data and sample data combination of [T(t,1), R(1,1)], which is (221, 5). K(1,r) represents a set of values measured for a template data and sample data combination of [T(1,1), R(r,1)], which is (3, 220). K(t,r) represents a set of values measured for a template data and sample data combination of [T(t,1), R(r, 1)], which is (221, 220).

Once grid 44 is formed, an absolute distance d between each point of a grid is calculated from 1 to N in general. FIG. 5 is a diagram of an exemplary calculation of an absolute distance d. As shown in FIG. 5, formula 50 is used to calculate an absolute distance between each point of a grid. For example, the absolute distance of K(t,r) is calculated by $[T(t,1)-R(r,1)]^2$, which equals to $(221-200)^2=1$. Similarly, the absolute distance of K(3,1) is calculated by $[T(3,1)-R(1,1)]^2$, which equals to $(11-5)^2=36$.

Figure 6:
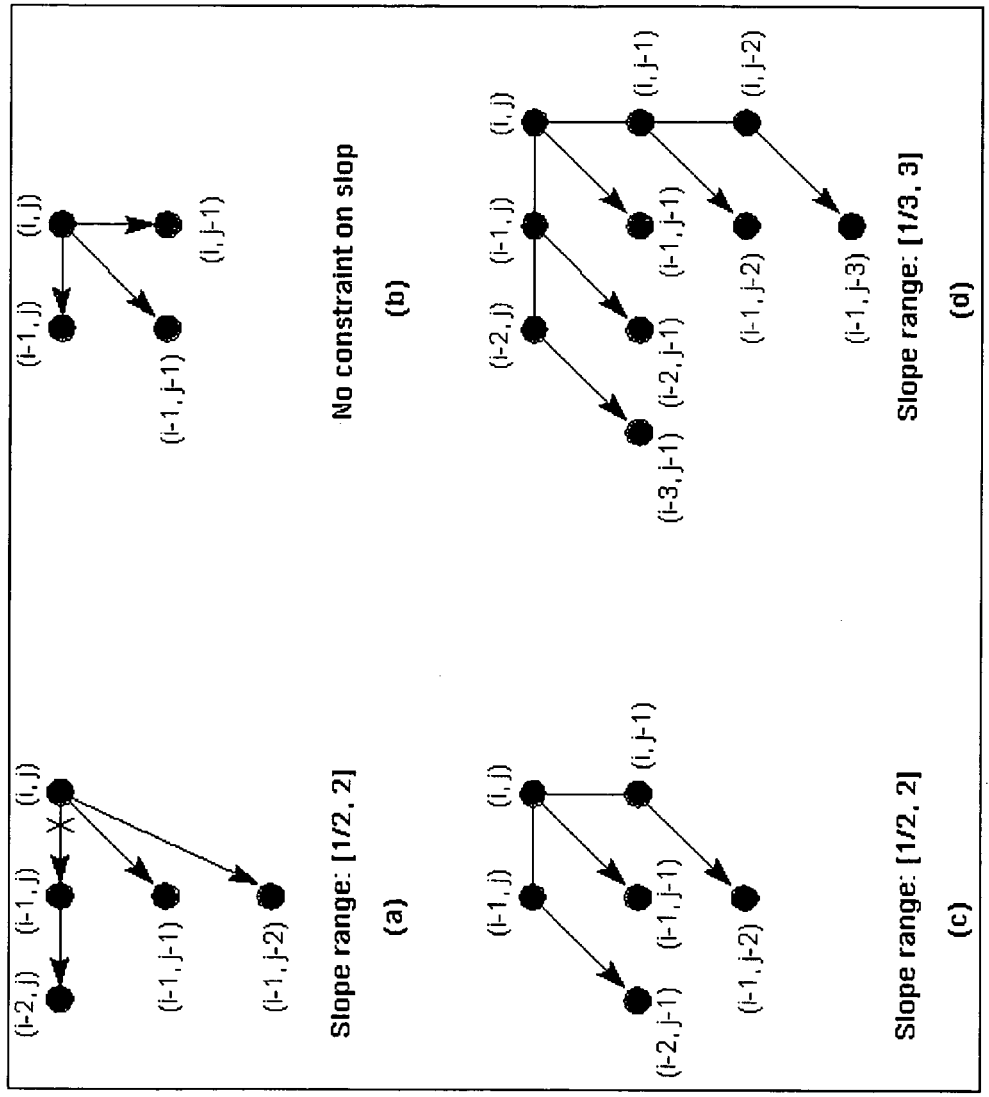
FIG. 6 is a diagram of exemplary local continuity constraints.

In order to determine a best path through a grid of points, several factors have to be specified. One of which is local continuity constraints. Local continuity constraints define localized features of the path, for example, a slope of the path. FIG. 6 is a diagram of exemplary local continuity constraints. As shown in case (b) of FIG. 6, when an absolute distance d of each grid is calculated, no constraint is imposed on the slope. The slope is then backtracked from point (i,j) to one of the points (i−1,j), (i−1,j−1), and (i,j−1). Since no constraint is imposed on the slope, the path may follow one of the horizontal, vertical, or diagonal transitions, so long as the calculated absolute distance d is the smallest. Alternative to not imposing constraint to the slope, other constraints may be imposed on the slope of the path. Case (a), (b), and (c) in FIG. 6 illustrate examples of more complicated constraints that may be imposed.

Figure 7:
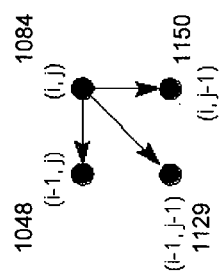
FIG. 7 a diagram of an exemplary calculation of the minimum accumulated distance of each point.

FIG. 7 is a diagram of an exemplary calculation of the minimum accumulated distance of each point. There are a few assumptions for calculating the minimum accumulated distance of each point. The first assumption is that D(i,j) is defined as the minimum accumulated distance from point (1,1) to point (i,j). The second assumption is that D(1,1) is equal to the absolute distance d(1,1). The third assumption is if the global optimal path P goes through point (i,j). the optimal path to point (i,j) is part of the global optimal path P. The fourth assumption is that the optimal path to point (i,j) depends on the previous grid point.

As shown in FIG. 7, formula 70 is used to calculate a minimum accumulated distance of each point. In this example, the minimum accumulated distance D(i,j) is equal to d(i,j) plus the minimum of the accumulated distance D(i−1,j), D(i−1,j−1), and D(i,j−1). Since the accumulated distance between D(i−1,j), which has a value of 1048, and D(i,j), which has a value of 1084, is the smallest compared to other minimum accumulated distances, the minimum accumulated distance of D(i,j) is calculated with point D(i−1,j).

Figure 8:
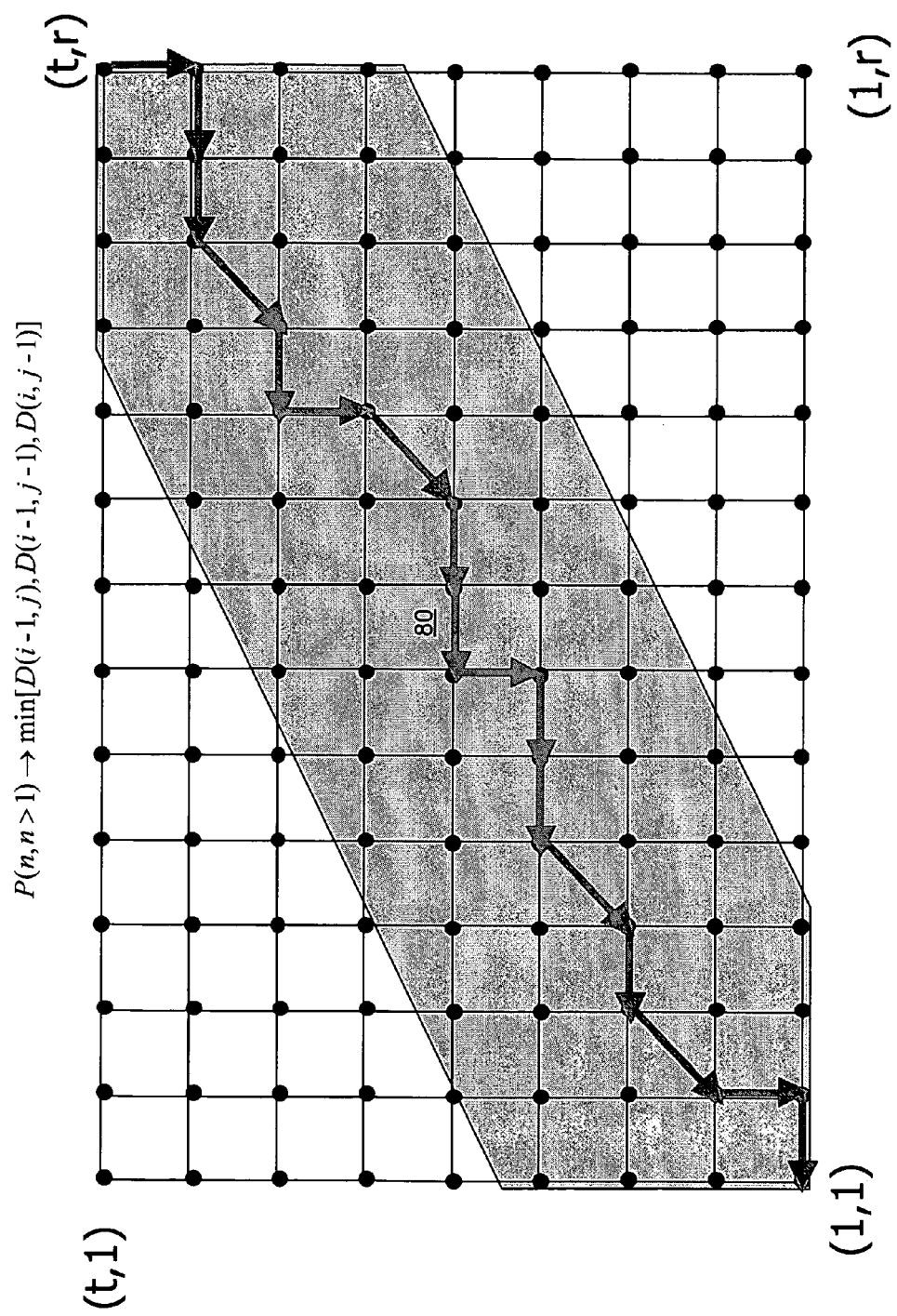
FIG. 8 is a diagram of an exemplary search of a global optimal path starting from an end to a beginning of the set of grids.

FIG. 8 is a diagram of an exemplary search of a global optimal path starting from an end to a beginning of the set of grids. As shown in FIG. 8, based on the minimum accumulated distance of each point calculated using formula 70, a global optimal path 80 is searched from the end of the set of grids (t,r) to the beginning of the set of grids (1,1). In addition to starting from the end to the beginning to search for a global optimal path, other methods of search, for example, starting from the beginning to the end, may be utilized without departing the spirit and scope of the present disclosure.

Figure 9:
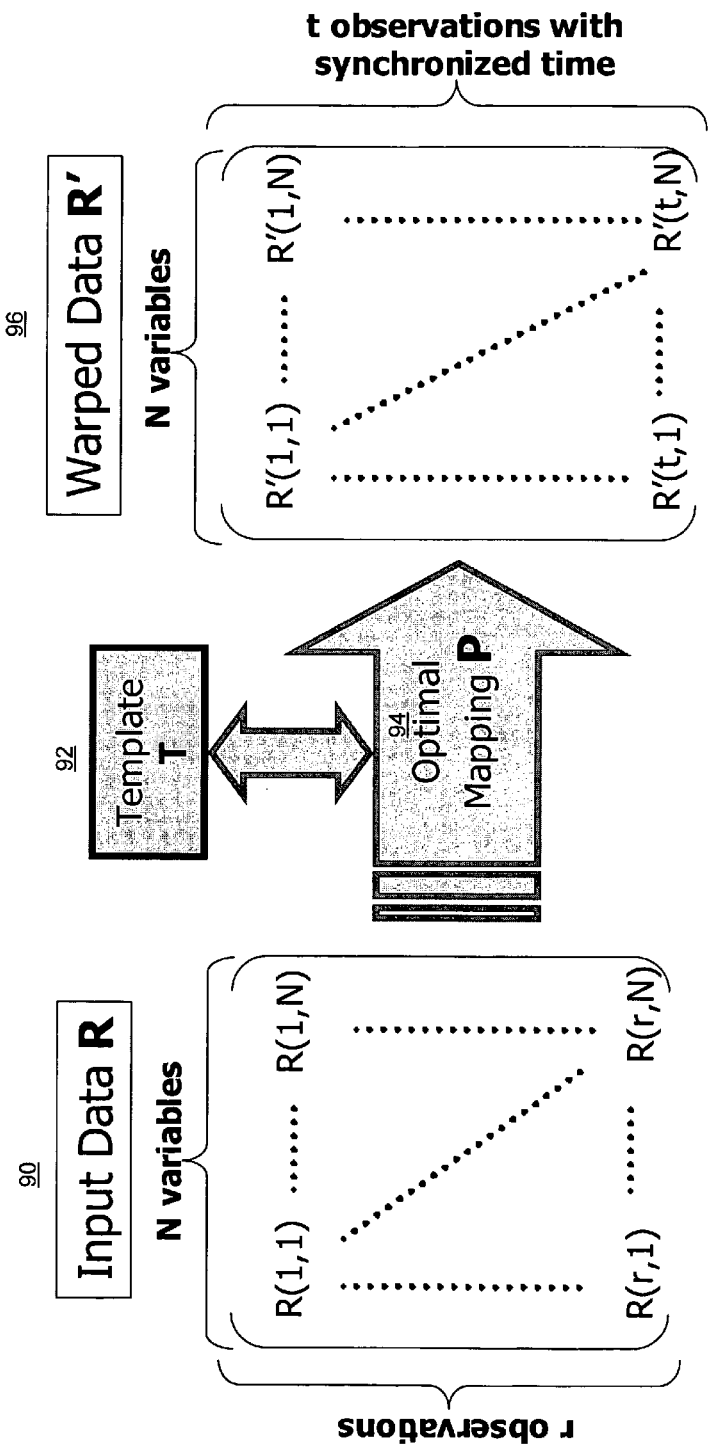
FIG. 9 is a diagram of an exemplary remapping of the sample batch with the global optimal path.

FIG. 9 is a diagram of an exemplary remapping of the sample batch with the global optimal path. As shown in FIG. 9, input data R 90 is sample data R from FIG. 4. Based on template data T 92 and global optimal path 94, input data R 90 is remapped to warped data R' 96, which also comprises t observations with N variables but with synchronized time.

Figure 10:
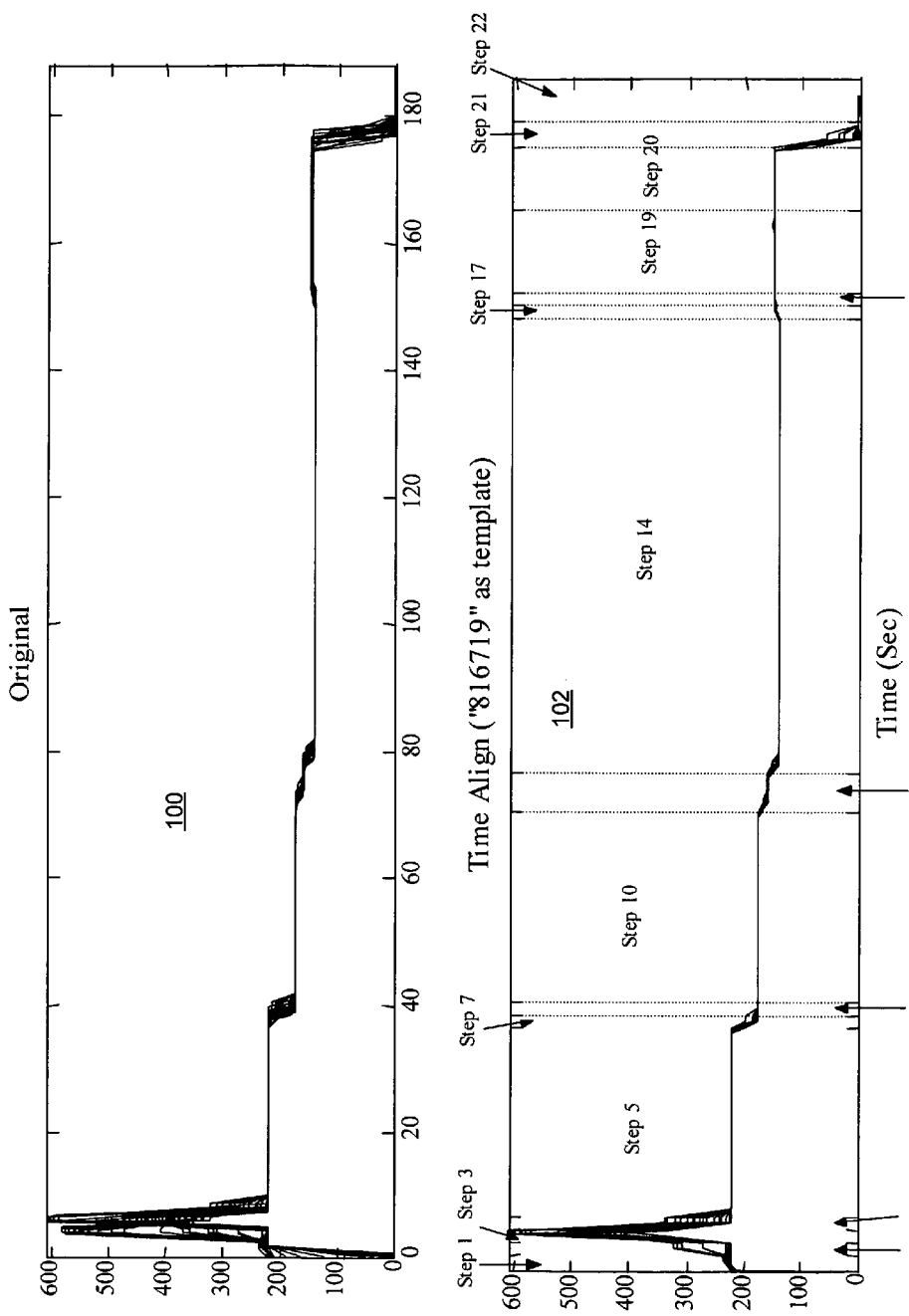
FIG. 10 is a diagram illustrating time lags between processes of wafer batches

FIG. 10 is a diagram illustrating time lags between processes of wafer batches. As shown in FIG. 10, a process data collection 100 comprises batches that have time lags between processes. These batches are not time-synchronized and duration-equalized. After applying the data filter provided by the present disclosure, process data collection 102 is generated. Data collection 102 comprises batches that are shifted and stretched with respect to time. Thus, time lags between processes are minimized.

Figure 11:
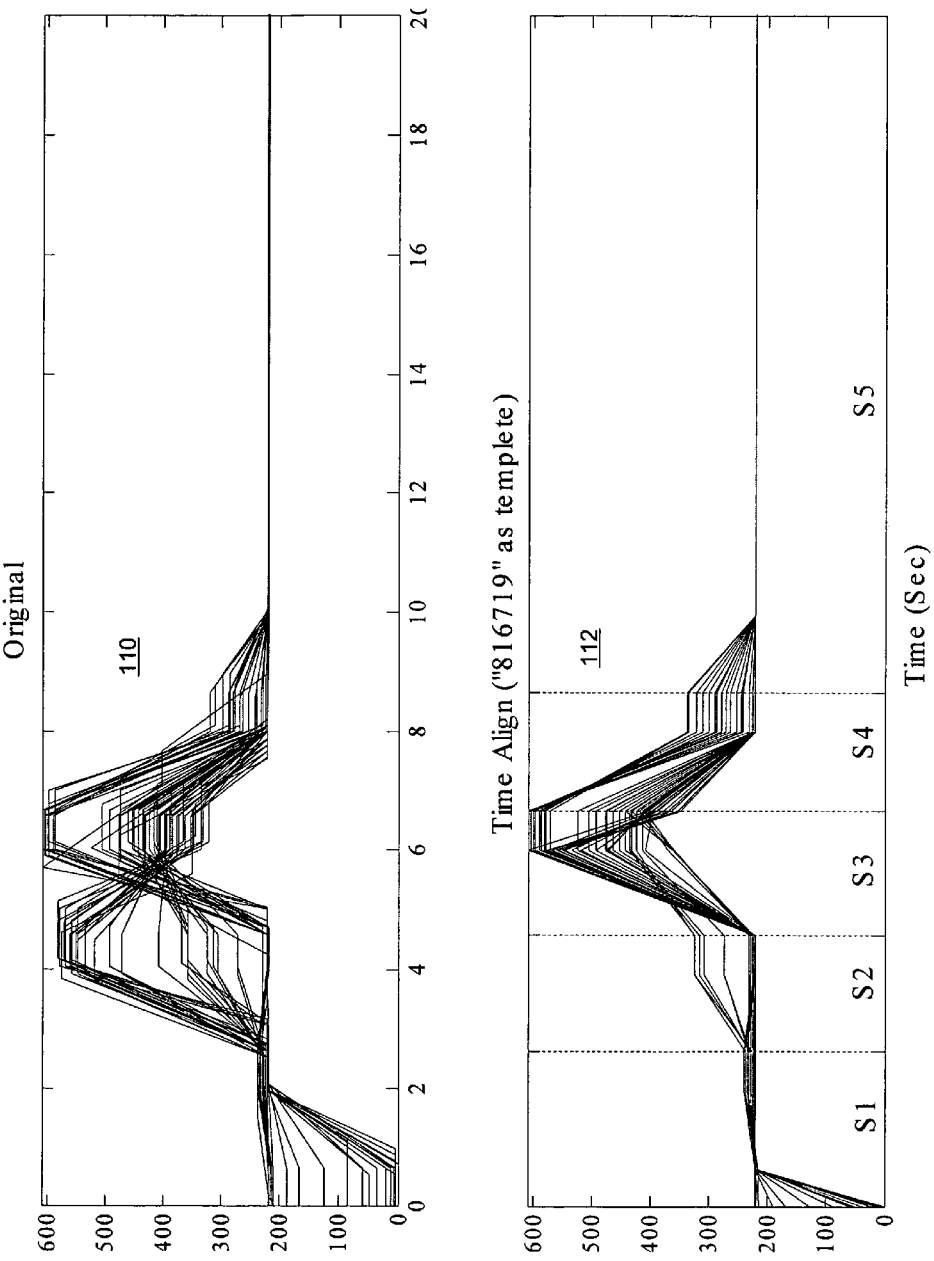
FIG. 11 is a diagram illustrating exemplary wafer process patterns.

FIG. 11 is a diagram illustrating exemplary wafer process patterns. As shown in FIG. 11, process data 110 is collected for a number of wafer batches. Each line in the pattern represents a different wafer batch. Process data 110 comprises patterns that are misaligned and mismatched. Thus, the wafer-to-wafer maturity of the wafer batches are not synchronized. After applying the data filter provided by the present disclosure, process data 112 is generated, which comprises patterns that are more aligned and matched. Thus, the wafer-to-wafer maturity of the batches are now synchronized.

Figure 12:
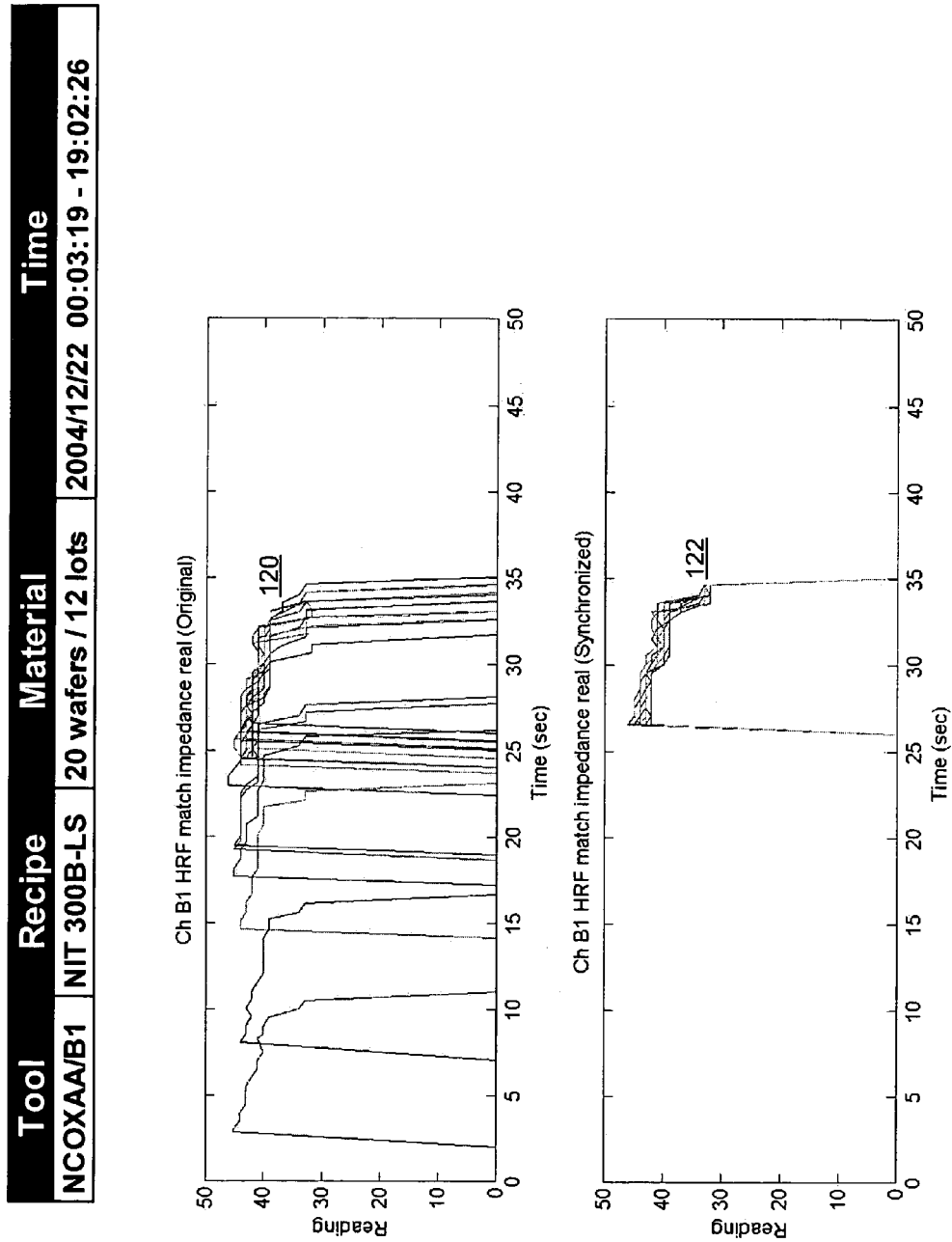
FIG. 12 is a diagram illustrating an exemplary assessment of trigger incapability.

FIG. 12 is a diagram illustrating an exemplary assessment of trigger incapability. Trigger incapability is a problem created by software that collects measurement data from wafer processes. Generally, data collection 120 of wafers may be triggered by a process start event or an initialization of a recipe step. However, the quality of data collection 120 is poor due to limitations of the software. For example, when wafers are fed through each processing step, the data collected for the first wafer may include data of the second wafer even though the first wafer has already been processed. This affects the ability to determine whether a real processing issue exists for the wafer or it is merely a software error.

An improvement to the quality of such data can be made by applying the data filter provided by the present disclosure to data collection 120. Data collection 122 illustrates the results of applying the data filter. In data collection 122, data between the range of 25 seconds to 35 seconds is now synchronized with respect to time. Thus, the trigger incapability problem may be properly isolated from real processing issues of the wafer.

Figure 13:
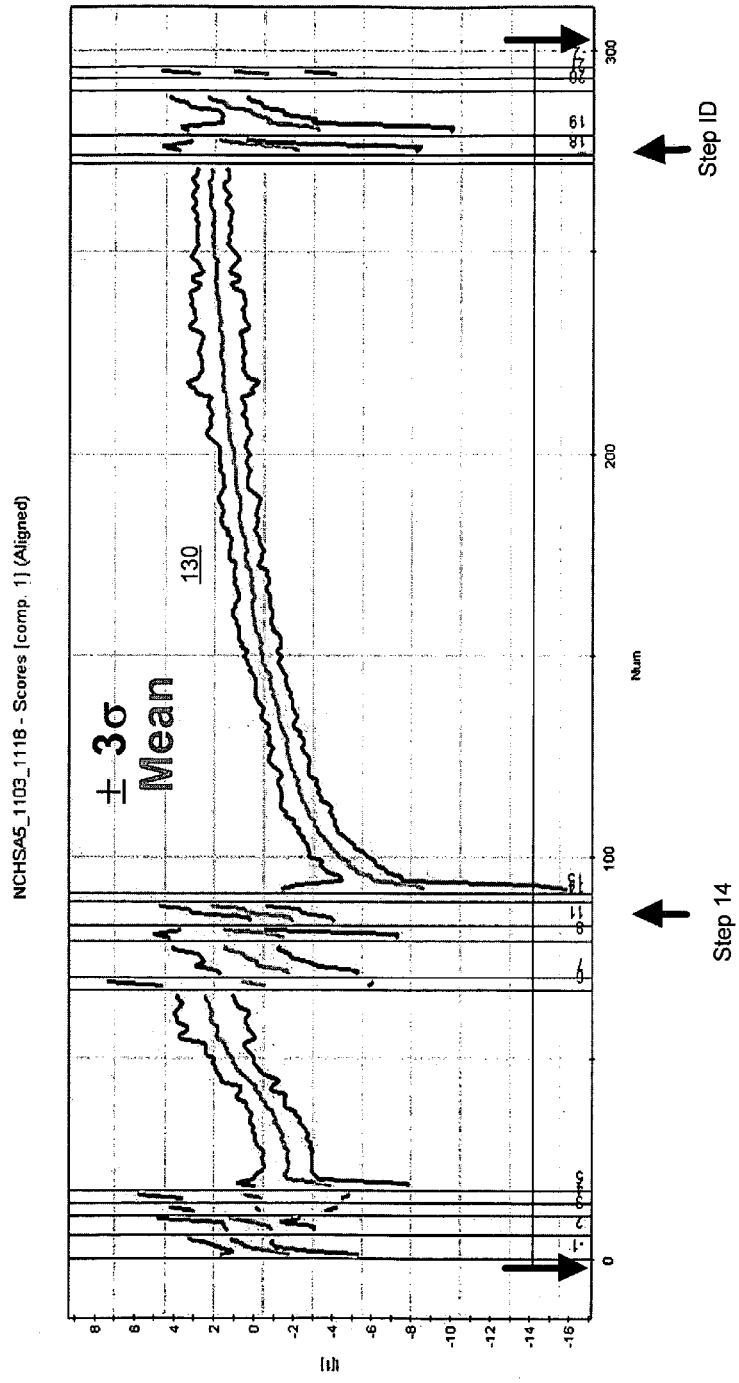
FIG. 13 is a diagram of an exemplary analysis of data by a current statistical analysis model.

FIG. 13 is a diagram of an exemplary analysis of data by a current statistical analysis model. As shown in FIG. 13, only multivariate analysis model 130 (mean and mean+/−3 standard deviations) can be displayed. No raw data profiles are present. In this example, multivariate analysis model 130 reflects that only one wafer, an outlier, is processed through step 14. In addition, several wafers suffered from missing data, for example, the values of "step ID". Due to the missing data, the analysis engine is unable to handle this group of data. Even though only data of one step is missing, the entire wafer profile cannot be shown. In addition, minus steps occur between wafer-to-wafer transient. This means that data from other wafers is included in the data of the previously processed wafer or/and next processed wafer, and thus, affects the reliability of the data.

Figure 14:
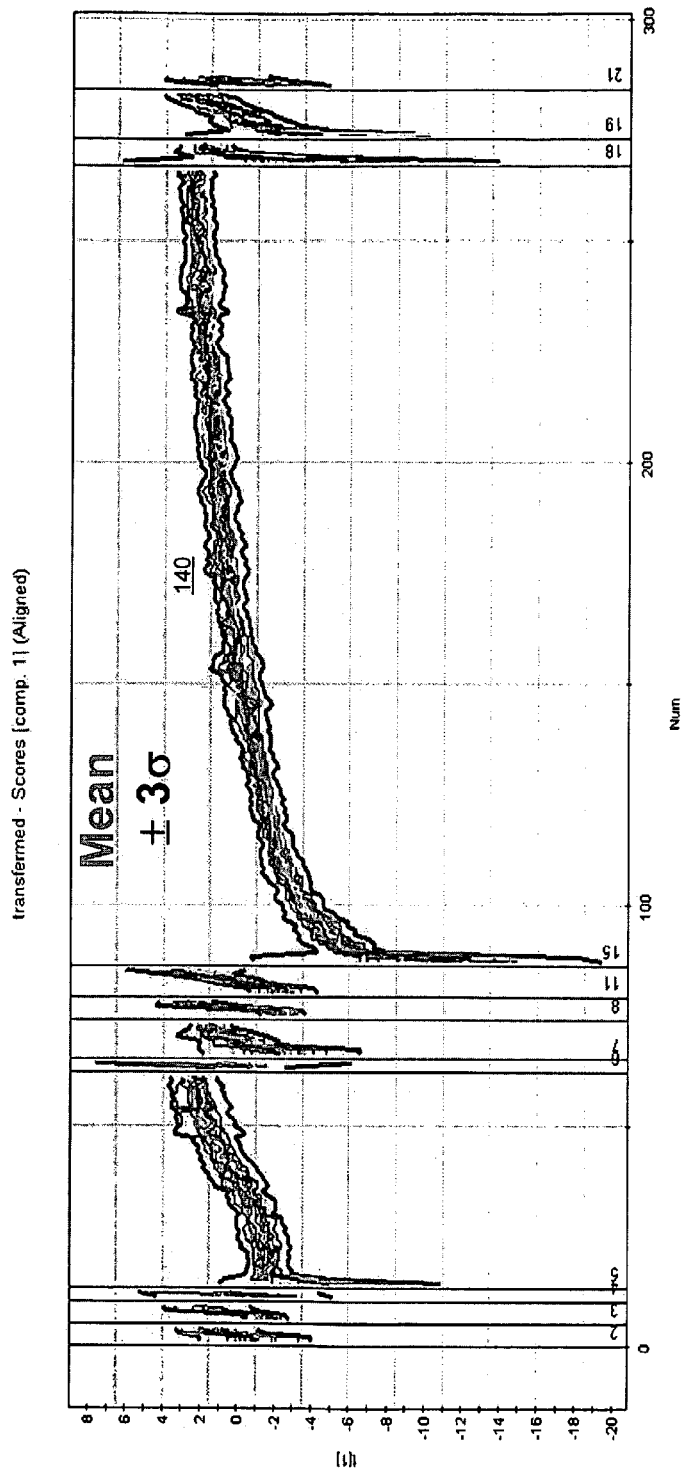
FIG. 14 is a diagram of an exemplary analysis of data by the data filter of the present re.

FIG. 14 is a diagram of an exemplary analysis of data by the data filter of the present disclosure. As shown in FIG. 14, after applying the data filter of the present disclosure, all inconsistencies caused by step errors or missing data in FIG. 13 are now aligned properly. Instead of only multivariate model profiles, data of all sixteen wafers are shown simultaneously in data collection 140. In addition, the minus steps are removed from multivariate analysis model 130 and the missing data are filled. Data collection 140 gives a more complete wafer profile than the multivariate analysis model 130 in FIG. 13.

FIG. 15 is a diagram of exemplary tightening of data range by the data filter of the present disclosure. As shown in FIG. 15, with the current statistical analysis model, the average range 150 of the wafer temperature is 73 degrees. After applying the data filter of the present disclosure, the average range 152 of wafer temperature is 61 degrees. Thus, the range of data variations may be tightened and a smaller control limit may be defined.

In summary, the data filter provided by the present disclosure enhances process performance by transforming process data into consistent sizes with a set number of measurement points. In addition, the peaks of the wafer process profiles may be aligned. Software trigger incapability problem may be isolated from wafer process abnormality by eliminating data included from other wafers. Furthermore, missing data may be filled and outliers may be eliminated by the data filter. Wafer process profile data range may be tightened and the control limits may be defined narrowly.

In addition to a technique introduced above, data interpolation may also be used to preprocess or filter data. Data interpolation converts a data trajectory of an arbitrary size into a trajectory of a consistent size. It uses available points from the raw data to generate points at a constant increments from the start to the end of the batch. While data interpolation is simple to implement, it does not always ensure that the wafer profile patterns or events are aligned properly.

Although only a few exemplary embodiments of this invention have been described in detail above, those skilled in the art will readily appreciate that many modifications are possible in the exemplary embodiments without materially departing from the novel teachings and advantages of this invention. It is understood that various different combinations of the above-listed steps can be used in various sequences or in parallel, and there is no particular step that is critical or required. Also, features illustrated and discussed above with respect to some embodiments can be combined with features illustrated and discussed above with respect to other embodiments. Accordingly, all such modifications are intended to be included within the scope of this invention.

What is claimed is:

1. A method for filtering process data to monitor process performance in a facility having a plurality of processes for processing batches of semiconductor wafers, the method comprising:
   receiving a set of process data from the plurality of processes, wherein the set of process data are collected within a set of non-uniform time intervals;
   filtering the set of process data to form a set of filtered data; and
   providing the set of filtered data to a statistical control model;
   whereby the statistical control model uses the filtered data to provide a process performance analysis.

2. A method for filtering process data to monitor process performance in a facility having a plurality of processes for processing batches of semiconductor wafers, the method comprising:
   receiving a set of process data from the plurality of processes;
   filtering the set of process data to form a set of filtered data; and
   providing the set of filtered data to a statistical control model;
   whereby the statistical control model uses the filtered data to provide a process performance analysis, wherein filtering the set of process data to form a set of filtered data comprises:
      separating the set of process data into a set of template data and a set of sample data;
      forming a set of grids from the set of template data;
      mapping the sample data to a grid; and
      calculating an absolute distance between the sample data and a point of the grid to create the set of filtered data.

3. The method of claim 2, wherein calculating the distance comprises:
   calculating a minimum accumulated distance of a point of the grid;
   identifying a global optimal path based on the minimum accumulated distance of the point; and
   remapping the set of sample data based on the global optimal path and the set of reference data.

4. The method of claim 3, wherein the global optimal path is identified starting from an end to a beginning of the set of grids.

5. The method of claim 3, wherein an optimal path to a point is part of the global optimal path if the global optimal path goes through the point.

6. The method of claim 5, wherein the optimal path to the point depends on a previous point of the grid.

7. The method of claim 3, wherein the set of filtered data comprises fewer time lags between processing steps of wafer batches than the set of statistical process data.

8. The method of claim 3, wherein the set of filtered data comprises more synchronized wafer profile patterns than the set of statistical process data.

9. The method of claim 3, wherein time intervals between each processing step of wafer batches in the set of filtered data are uniform.

10. The method of claim 3, wherein missing data in the set of statistical process data is filled in the set of filtered data.

11. The method of claim 3, wherein the set of filtered data is used for isolating trigger incapability problem from real processing issues of wafer batches.

12. The method of claim 3, wherein the set of filtered data comprises a uniform number of measurements for each wafer batch.

13. The method of claim 3, wherein incidental outliers in the set of statistical process data are eliminated from the set of filtered data.

14. The method of claim 3, wherein a range of data variable is tighter in the set of filtered data than the set of statistical process data.

15. The method of claim 2, wherein the set of template data is collected from a batch of wafers having measurement data collected most frequently within a period of time.

16. The method of claim 2, wherein the set of template data and the set of sample data comprise a plurality of observations of one or more variables.

17. The method of claim 16, wherein the variables include wafer temperature and wafer pressure.

18. The method of claim 2, wherein the grid comprises a set of points, wherein each point in the set of points represents a set of values measured for a template data and sample data combination.

19. The method of claim 18, wherein the set of values comprises a value measured for a specific template data in the set of template data and a value measured for a specific sample data in the set of sample data.

20. The method of claim 2, wherein the absolute distance between each point of a grid is calculated based on local continuity constraints.

21. A system for filtering statistical process data to enhance process performance comprising:
 a collector for collecting a set of process data from processing of wafer batches;
 a data filter for filtering the set of process data to form a set of filtered data; and
 a statistical control model for determining performance of a process based on the set of filtered data;
 wherein the data filter is configured, upon receipt of the process data, to select a set of template data from the set of process data, form a set of grids comprising the set of template data and a set of sample data, and calculate an absolute distance between each point of a grid in the set of grids.

22. The system of claim 21, wherein the data filter is further configured to calculate a minimum accumulated distance of a point of the grid using the absolute distance, identify a global optimal path based on the minimum accumulated distance of the point, and remap the set of sample data based on the global optimal path and the set of reference data to form the set of filtered data.

* * * * *